L D CUTLER.
GOGGLES.
APPLICATION FILED AUG. 2, 1912.

1,082,480.

Patented Dec. 23, 1913.

WITNESSES

INVENTOR
L D Cutler
BY
ATTORNEYS

UNITED STATES PATENT OFFICE.

L D CUTLER, OF WINDSOR LOCKS, CONNECTICUT.

GOGGLES.

1,082,480.

Specification of Letters Patent. Patented Dec. 23, 1913.

Application filed August 2, 1912. Serial No. 712,860.

*To all whom it may concern:*

Be it known that I, L D CUTLER, a citizen of the United States, and a resident of Windsor Locks, in the county of Hartford and State of Connecticut, have invented new and useful Improvements in Goggles, of which the following is a full, clear, and exact description.

The object of the invention is to provide certain new and useful improvements in goggles, whereby a close fitting of the lenses to the face and especially at the nose is insured to prevent dust or other foreign matter from passing into the eyes of the wearer, and to properly support the goggles at the nose without undue strain.

For the purpose mentioned use is made of lens clips attached to the lenses and pivotally connected with each other by a bridge, and springs interposed between the ends of the bridge and the lens clips.

A practical embodiment of the invention is represented in the accompanying drawings forming a part of this specification, in which similar characters of reference indicate corresponding parts in all the views.

Figure 1:
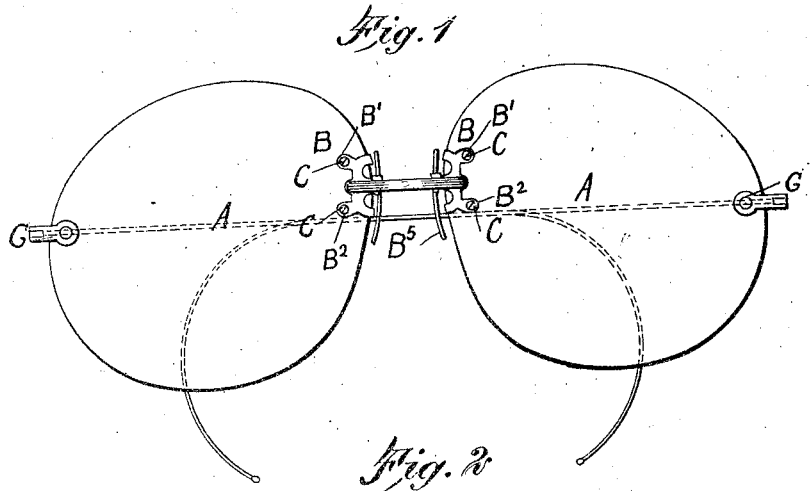
Figure 2:
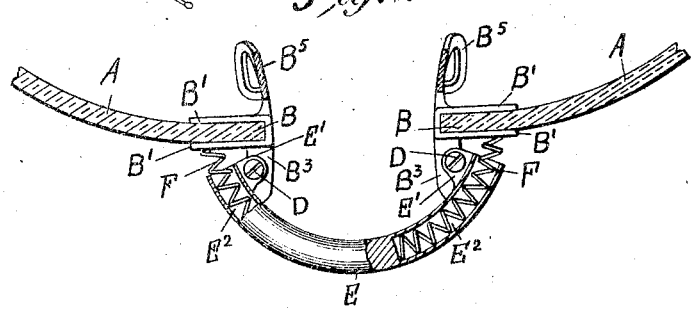
Figure 3:
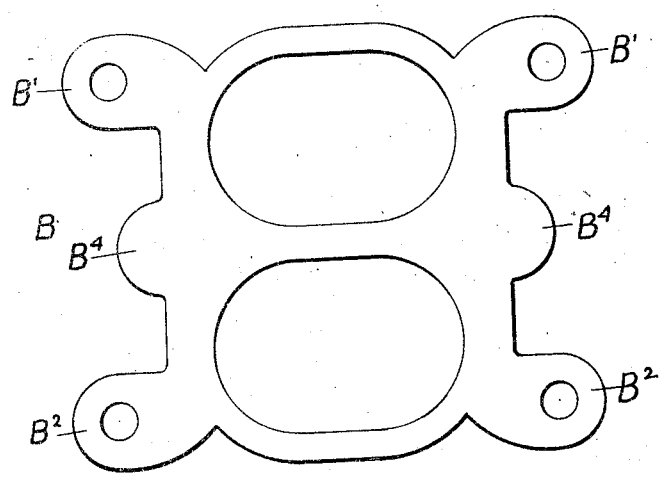

Figure 1 is a face view of the goggles; Fig. 2 is an enlarged sectional plan view of the same, part of the bridge being shown in plan; and Fig. 3 is an enlarged plan view of the blank for forming one of the lens clips.

To the inner edges of the lenses A are secured the lens clips B, B, each formed of a single piece of metal doubled up into U shape to straddle the lens, each clip having two pairs of oppositely-disposed ears $B'$, $B'$ and $B^2$, $B^2$ engaged by the usual fastening screws C, each threaded into one of the ears and passing through apertures in the lenses A. The lens clips B, B are provided with forward extensions $B^3$ carrying pivots D on which are mounted to swing lugs $E'$ projecting rearwardly from the bridge E near the ends thereof, as plainly indicated in Fig. 2, so that the nose clips B, B are pivotally connected with each other by the bridge E. The ends of the bridge E are made hollow or tubular for the reception of coiled springs F, F bearing at their outer ends on integral lugs $B^4$ formed on the lens clips B, B intermediate the corresponding ears $B'$, $B^2$. The lens clips B, B are provided with nose clips or guards $B^5$ for engagement with the sides of the nose so as to securely support the lenses A, A at their inner edges, the outer edges of the lenses being provided with the usual temples G for engagement with the ears of the user. The projections $B^3$ are extended forwardly beyond the pivots D to abut against the inner face of the bridge E with a view to limit the swinging motion of the lenses A relative to the bridge E.

It will be noticed that by the arrangement described the springs F exert sufficient pressure against the clips B, B and consequently on the lenses A, A to hold the same firmly in contact with the face of the wearer, thus preventing dust and other extraneous matter from passing to the eyes of the wearer.

By reference to Fig. 1, it will be noticed that the inner edges of the lenses A, A are shaped to fit close to the opposite sides of the nose, and by arranging the pivots D in front of the lenses the said inner edges of the lenses A are practically in contact with the sides of the nose, thus preventing dust and other foreign matter from passing into the eyes at the nose.

Having thus described my invention, I claim as new and desire to secure by Letters Patent:

1. A goggle mounting, comprising lens clips adapted to be attached to the lenses having forward extensions, a bridge having rearwardly extending lugs pivoted to the extensions of the lens clips, and springs interposed between the bridge and the said lens clips.

2. A goggle mounting, comprising lens clips adapted to be secured to the lenses and having a nose clip, a bridge pivotally connected with the said lens clips and having hollow ends, and springs in the said hollow bridge ends and bearing against the said lens clips.

3. A goggle mounting, comprising lens clips having flanges adapted to be secured to the lenses, pivots on the front of the lens clips, a bridge having hollow ends and rearwardly-extending lugs mounted on the said pivots, and coiled springs extending within the said hollow bridge ends and bearing on the said lens clips.

4. A goggle mounting, comprising lens clips having flanges adapted to be secured to the lenses, pivots on the front of the lens clips, a bridge having hollow ends and rearwardly-extending lugs mounted on the said pivots, coiled springs extending within the said hollow bridge ends and bearing on the said lens clips, and nose clips extending integrally from the said lens clips in a rearward direction.

5. A goggle mounting, comprising lens clips having flanges adapted to be secured to the lenses, pivots on the front of the lens clips, a bridge having hollow ends and rearwardly-extending lugs mounted on the said pivots, and coiled springs extending within the said hollow bridge ends and bearing on the said lens clips, the lens clips having limiting stops adapted to abut against the bridge.

6. A lens mounting, comprising lens clips having nose guards and forwardly projecting members, a bridge having adjacent to its ends rearwardly extending lugs, pivoted to the forwardly projecting members of the lens clips a short distance from their ends, the portions of said members beyond the pivots forming stops for limiting the swinging movement of the lens relative to the bridge, and springs interposed between the bridge and lens clips.

7. A blank for a lens clip comprising a plate having two elongated openings, one at each side of the center thereof and provided on two opposite sides with pairs of spaced apertured ears, and a lug intermediate of each pair of ears.

In testimony whereof I have signed my name to this specification in the presence of two subscribing witnesses.

L D CUTLER.

Witnesses:
 LEON WILCOX,
 FRED KOEHLER, Jr.